Figure 1:
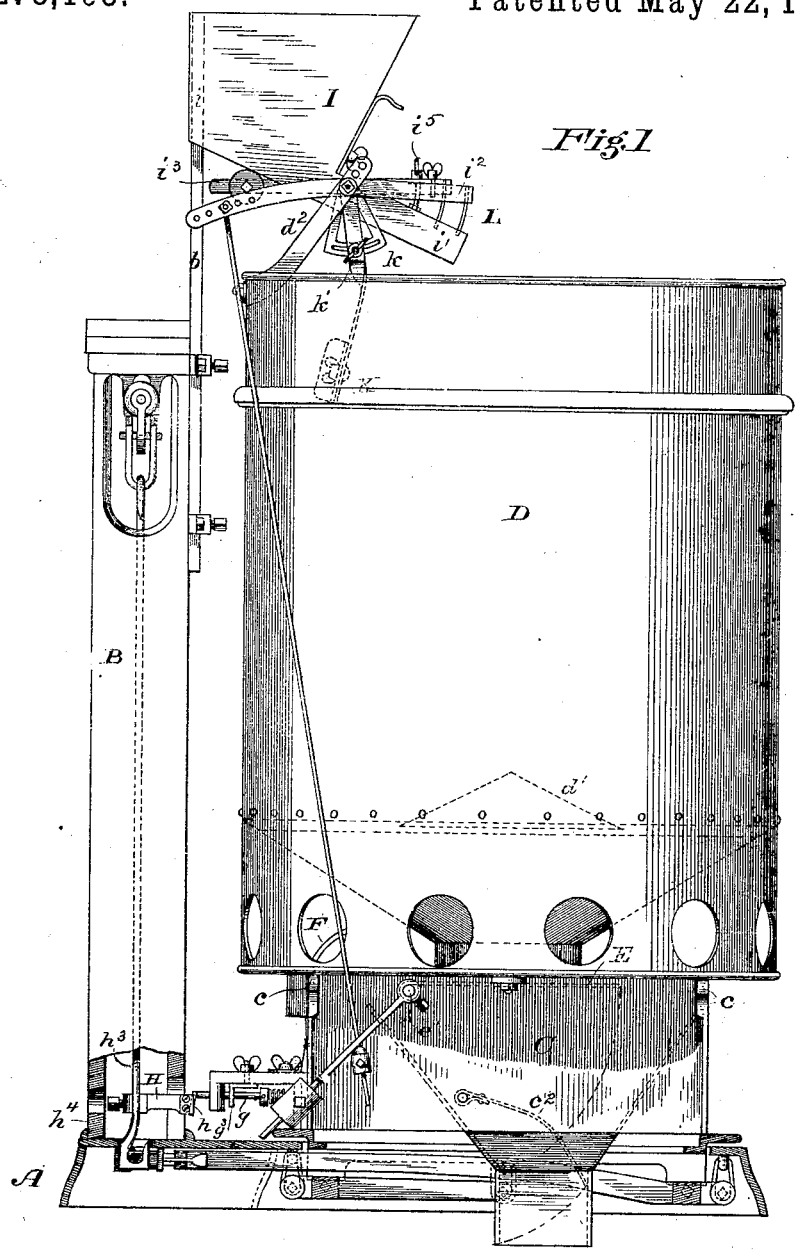

(No Model.) 6 Sheets—Sheet 1.

J. STEVENS.
AUTOMATIC GRAIN WEIGHING MACHINE.

No. 278,193. Patented May 22, 1883.

Attest
Herbert D. Blakemore
Geo. B. Parkinson

Inventor
John Stevens
By Parkinson & Parkinson
Attorneys (No Model.) 6 Sheets—Sheet 2.
J. STEVENS.
AUTOMATIC GRAIN WEIGHING MACHINE.

No. 278,193. Patented May 22, 1883.

Attest  
Herbert D. Blakemore  
Geo. B. Parkinson

Inventor  
John Stevens  
By Parkinson & Parkinson  
Attorneys (No Model.)  6 Sheets—Sheet 3.
J. STEVENS.
AUTOMATIC GRAIN WEIGHING MACHINE.
No. 278,193.  Patented May 22, 1883.
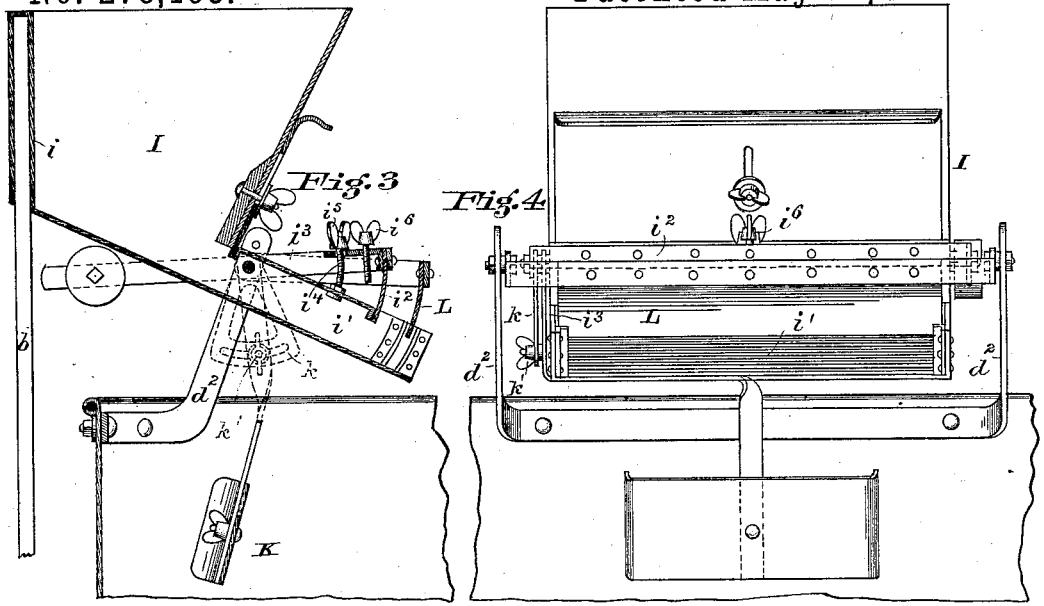
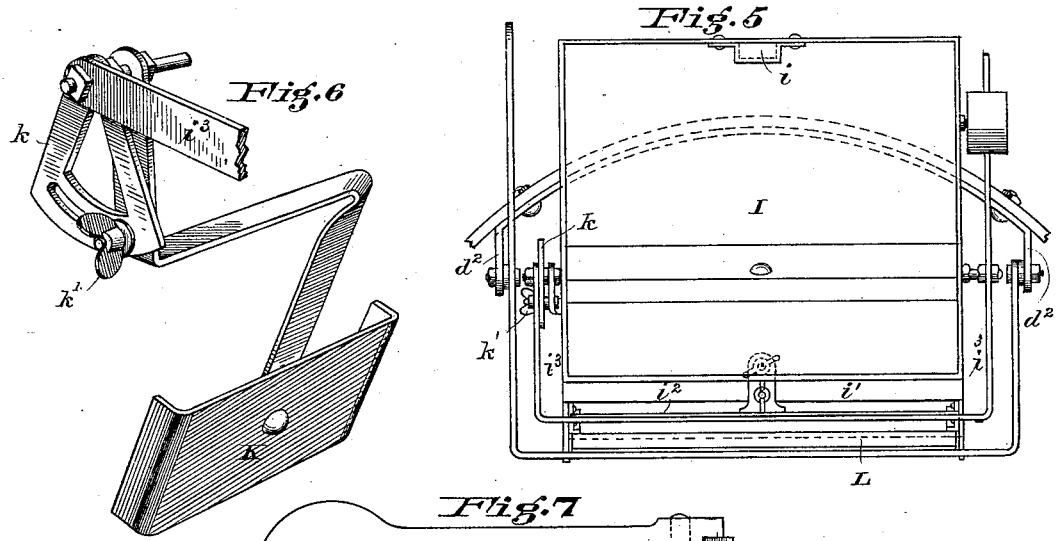
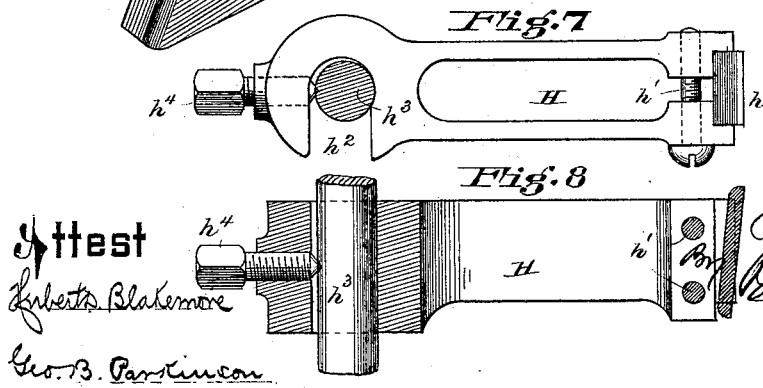
Attest
Huberts Blakemore
Geo. B. Parkinson
Inventor
John Stevens
By Parkinson & Parkinson
Attorneys (No Model.)  6 Sheets—Sheet 4.

J. STEVENS.
AUTOMATIC GRAIN WEIGHING MACHINE.

No. 278,193. Patented May 22, 1883.

Attest  
Herbert D. Blakemore  
Geo. B. Parkinson

Inventor  
John Stevens  
By Parkinson & Parkinson  
Attorneys (No Model.) 6 Sheets—Sheet 5.
J. STEVENS.
AUTOMATIC GRAIN WEIGHING MACHINE.
No. 278,193. Patented May 22, 1883.
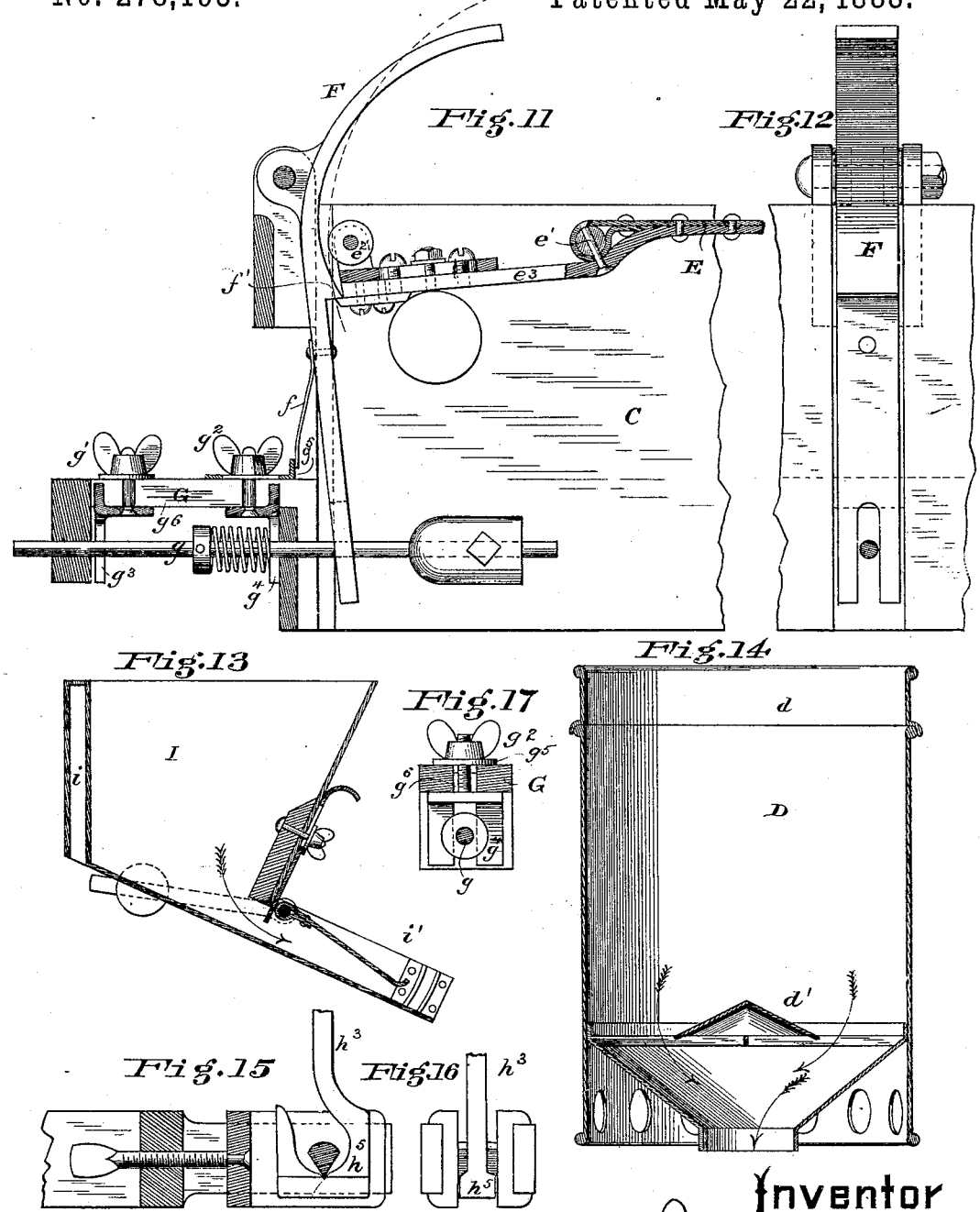

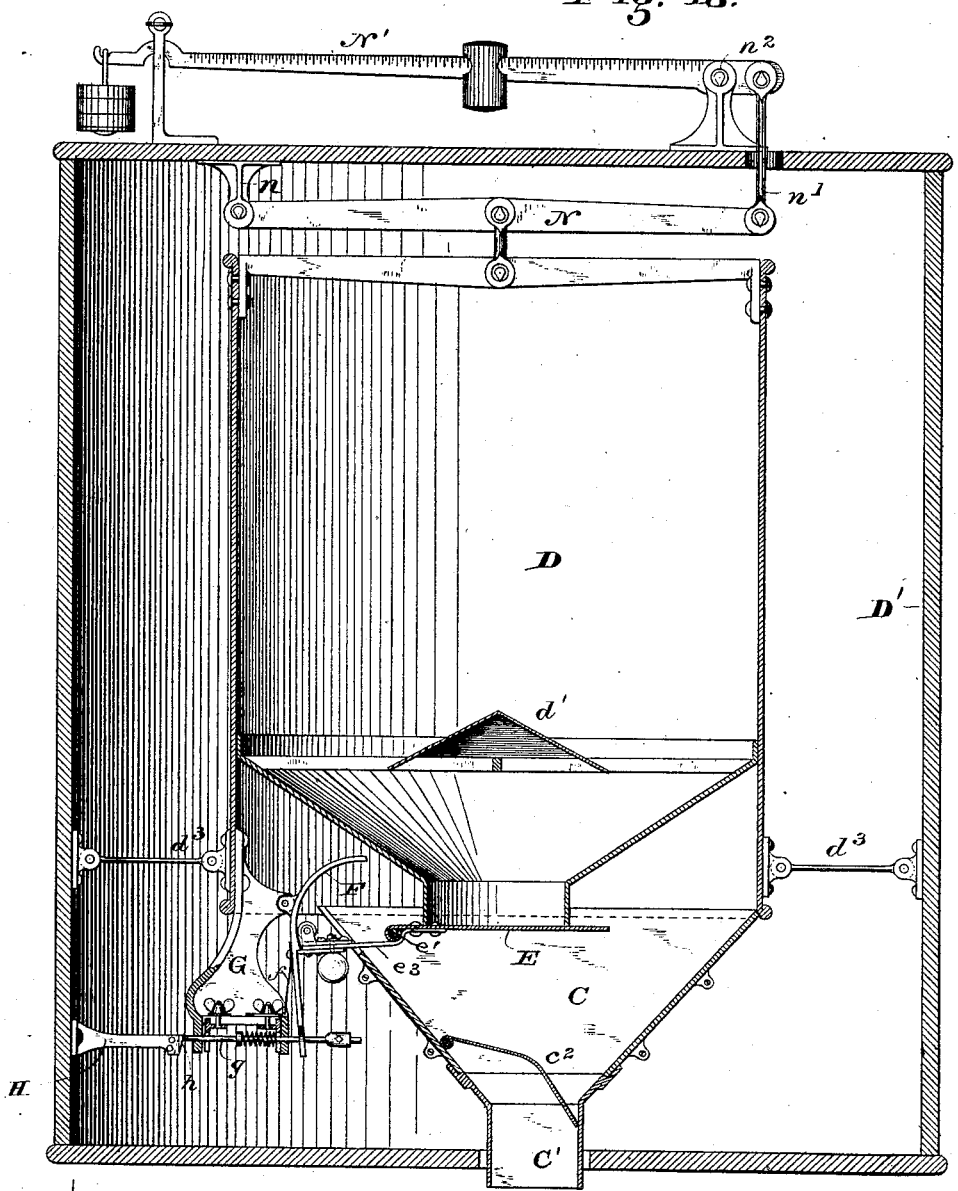

UNITED STATES PATENT OFFICE.

JOHN STEVENS, OF NEENAH, WISCONSIN.

AUTOMATIC GRAIN-WEIGHING MACHINE.

SPECIFICATION forming part of Letters Patent No. 278,193, dated May 22, 1883.

Application filed September 19, 1882. (No model.)

*To all whom it may concern:*

Be it known that I, JOHN STEVENS, of Neenah, in the county of Winnebago and State of Wisconsin, have invented certain new and useful Improvements in Automatic Weighing-Machines, of which the following is a specification.

The present invention is an improvement upon one described in an application for Letters Patent of the United States filed by me on the 5th day of November, 1881; and it consists in providing the weighing-receptacle with removable lengthening-rims adapted to set one upon the other to accommodate larger or smaller quantities of material and making the feed-hopper adjustable vertically to follow changes in the size of the receptacle; in placing above the discharge-gate a shield to support the superincumbent mass and prevent too great pressure upon the said gate; in placing the slow-down float at an inclination that the tendency of the accumulating material may be to lift as well as to push it aside; in combining with said float a slow-down gate moving at substantially right angles to the path of the material; in combining with the slow-down gate an adjustable stop to determine the maximum distance it may rise from the floor of the delivery-spout, whereby the main stream may be a substantially-constant quantity; in mounting the pivot for the cut-off gate upon a bracket from the weighing-receptacle, whereby said pivot will maintain a constant relation to the pivot of the discharge-gate, by which the cut-off gate is operated, and whereby also the feed-hopper may be removed independently of said gate; in providing the feed-hopper with a sleeve adapted to take over the end of a supporting-rod from the scale-standard, so that said hopper may be vertically lifted off or returned to place in dismounting or assembling the machine; in combining with the trip-latch which holds the discharge-gate in place a spring carried thereby to insure its engagement with the arm or tang from said gate; in combining with a spring carried by the trip-latch an adjustable stop, against which said spring is brought as the latch returns to position after the discharge-gate has been tripped; in attaching the bracket for the trip-rod to the casing of the secondary discharge spout or hopper beneath the weighing-receptacle proper, that it may be lifted off of the scale with said hopper, leaving the scale-frame unoccupied for ordinary use; in a stop for the trip-bolt transversely slotted at its butt-end from one side to take over the scale-rod, and provided with a set-screw, whereby it may be readily placed and clamped upon said scale-rod; in providing the abutting end of the trip-stop with a plate of hardened steel or other hard burnished material adjustable as to its height or as to its inclination, or both, to receive the end of the trip-bolt, and in the various other combinations and details of construction hereinafter described and claimed.

Figure 2:
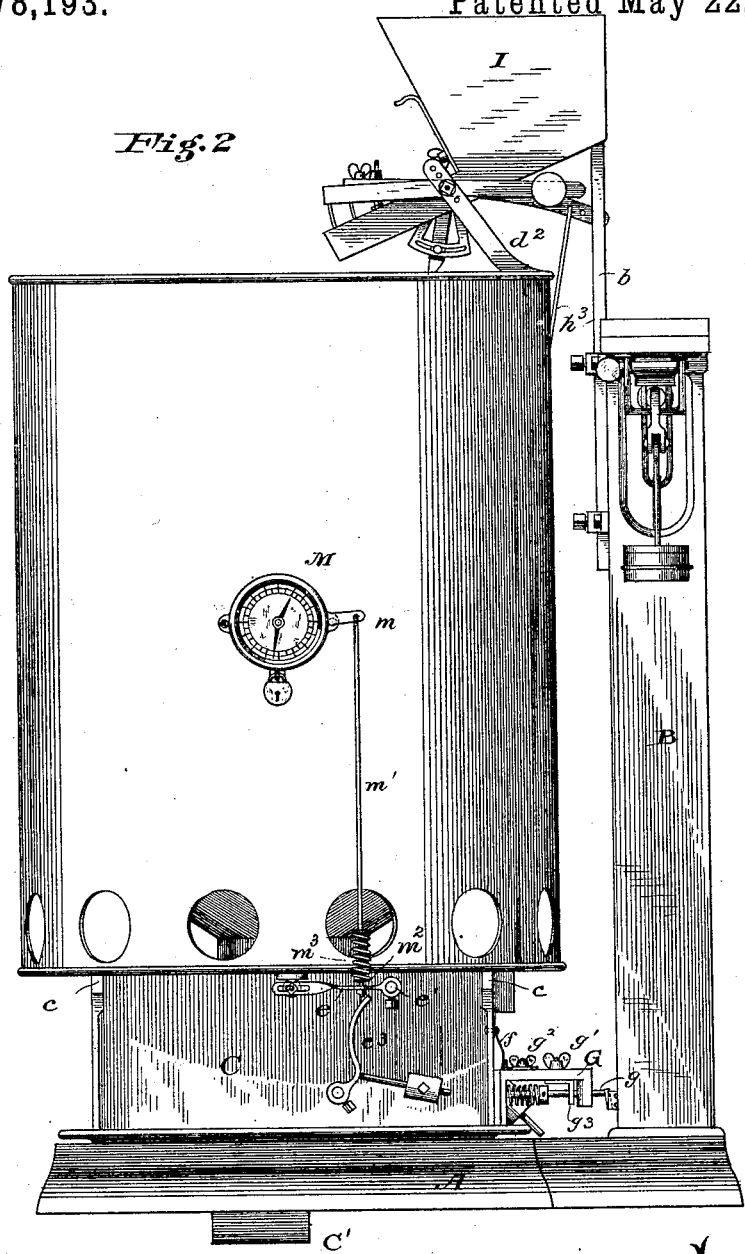
Figure 9:
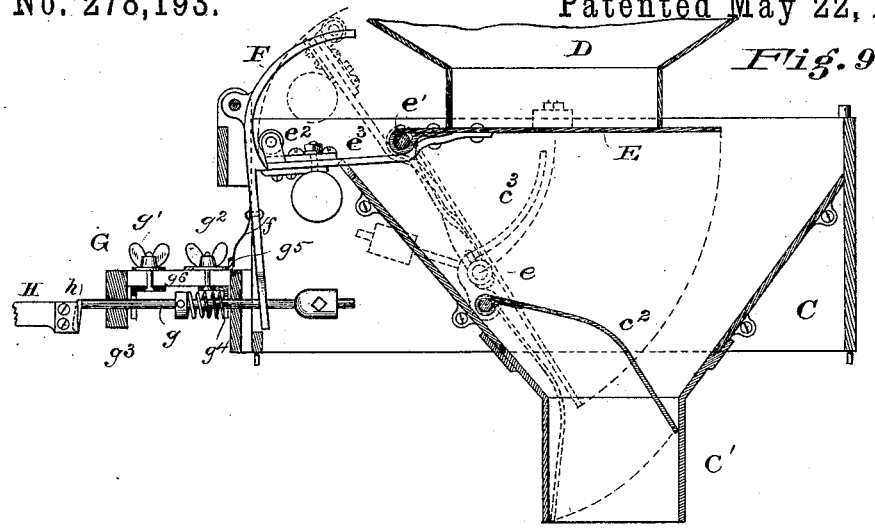
Figure 10:
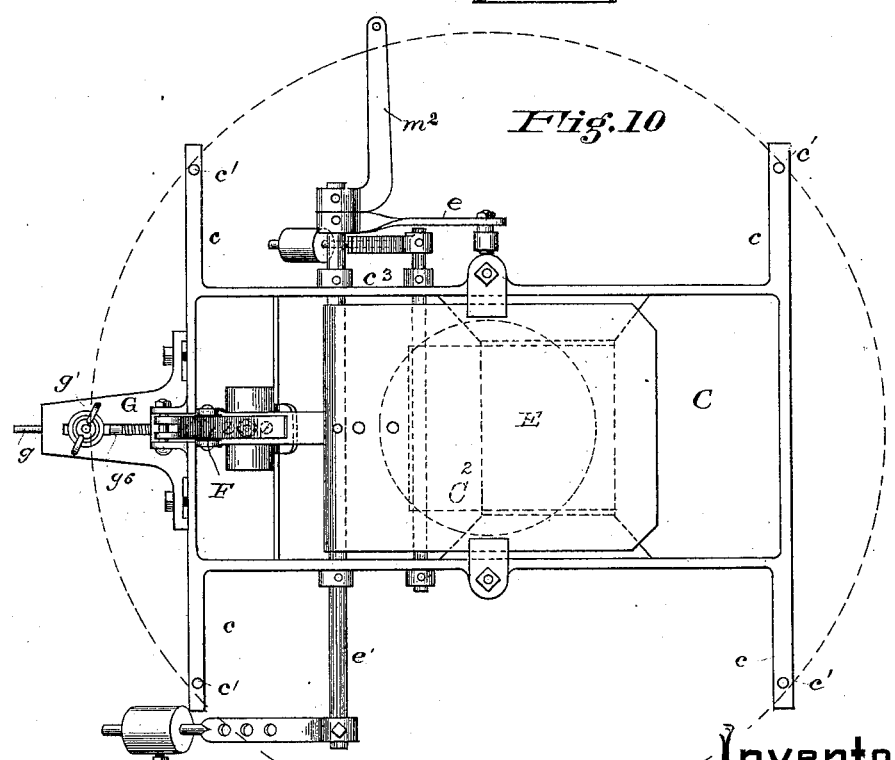

In the drawings, Figure 1 is a side elevation of a machine embodying my invention; Fig. 2, a like elevation from the opposite side of the machine; Fig. 3, a vertical transverse section through the feed-hopper and delivery-spout, and a portion of the weighing-receptacle enlarged. Fig. 4 is a front elevation, and Fig. 5 a top plan view, of the same. Fig. 6 is a detail of the slow-down float. Fig. 7 is a top plan view, and Fig. 8 a vertical longitudinal section through the trip-stop attached to the scale-rod, showing the adjustable plate at its abutting end. Fig. 9 is a vertical longitudinal section through the secondary discharge-spout, including the trip-latch, trip-bolt, and its bracket and trip-stop. Fig. 10 is a top plan view of the foregoing. Fig. 11 is an enlarged elevation of the trip-latch, trip-rod, and its bracket and certain accessory devices. Fig. 12 is a front view of the trip-latch. Fig. 13 is a modification of the feed-hopper. Fig. 14 is a vertical section through the weighing-receptacle to show the shield above the discharge-gate. Figs. 15 and 16 are details of the construction of the scale-rod to insure steadiness for the tripping operation. Fig. 17 is a vertical transverse section through the trip-rod and its bracket. Fig. 18 is a modification of the machine to adapt it to use with steel-yard-scales.

A is the base and B the standard of any ordinary platform-scale, which, as in my previous invention, is deemed preferable for use. Upon the frame or skeleton left by the removal of the central plate of the scale-platform is mounted the casing C of the eduction-spout or sub-spout C', said casing being rectangular in shape and having offsets or shoulders c, serving as seats for the cylindrical weighing-receptacle D above, and pins or keepers c', to center and retain said receptacle. The eduction-spout, as in the former case, passes between the scale bars or levers and connects with any suitable conveyer or other instrumentality for removing the material discharged by it. It also contains a secondary valve or gate, $c^2$, provided with a curved or cam-shaped catch-arm, $c^3$, taking over a roller on the end of an arm, $e$, from the pivot-shaft $e'$ of the main gate E to lock the latter in position when it is open. Pivoted also in the casing of this eduction-spout is the trip-latch F of the form described in the foregoing application; but instead of the projecting arm and counter-balance therein provided, I now propose to attach to said latch a spring, $f$, which will be carried with it as it is swung upon its pivot by the ascent of the roller $e^2$ upon the end of the catch-arm $e^3$ of the main gate, and which, as the latch returns to position, will come against an adjustable or other stop, so that as the main gate closes the latch will snap over the end of its catch-arm, and hold it certainly. A bracket, G, is bolted to the lower part of said casing to afford bearings for the trip-bolt $g$. The top of this bracket is slotted longitudinally, as at $g^6$, to receive the screw-spindles of thumb-nuts $g'$ $g^2$, the first of which clamps adjustably a stop or gage, $g^3$, by which the trip-bolt may be kept out of action or the length of its forward movement determined, the second clamping another gage, $g^4$, which serves as the seat of a spring by which the trip-bolt is urged forward, and by its adjustment determines the force of said spring. Both of these gages in the present instance are struck up from sheet metal in the forms shown—that is, they have a central body which receives the spindle of the thumb-nut, two downwardly-projecting arms saddling the trip-bolt, and an upwardly-projecting arm formed by the metal turned up from between the other two, which last-mentioned arm takes into the slot in the supporting-bracket, and serves to steady them and prevent their binding or becoming awry as they are adjusted. The thumb-nut $g^2$, which retains and serves as the means of adjustment of the spring gage or seat, being at the inner end of the bracket or nearest to the trip-latch, is, for convenience, made also to hold an adjustable stop, $g^5$, for the spring upon said latch, said stop being slotted to embrace the spindle of the screw, and come beneath the washer, and having a turned-up end, against which the spring will strike as the latch returns to its position after the tripping operation.

In practice, I have found it difficult to obtain the proper fit to secure sensitive action between the end of the trip-bolt and the trip-stop when the latter was made, as heretofore, of a single piece of metal. I therefore now provide the end of the trip-stop H with a plate of hardened steel or some equivalent material having a smooth or polished surface, and adopt means whereby said plate may be adjusted vertically, and also may be tipped to give a greater or less bevel opposing the trip-bolt. In the present instance the means employed are as follows: The trip-stop is slotted from the end opposing the trip-bolt nearly its whole length, so as to afford two arms having more or less spring or elasticity. In the end of these arms is formed a seat for the adjustable face-plate $h$, one-half of the seat in each arm. Immediately behind this seat the arms are bored transversely, and one of them screw-threaded to receive screws $h'$, whereby the face-plate may be clamped firmly in any position in which it is set in its seat. This trip-stop I also slot vertically and transversely, as at $h^2$, so that it may be readily passed over the scale-rod $h^3$ from one side thereof, and furnish it with a set-screw, $h^4$, by which it may be secured to said rod when once in position.

As scales are usually made the connection between the scale-rod and the block at the end of the scale-bars is by means of an ordinary hook on the lower end of said rod taking into an eye or over a round in said block. This does not give sufficient steadiness to the rod to hold the trip-stop properly in opposition to the trip-bolt; and to obviate the defect a link or eyebolt was made use of in the earlier form of the machine, passing from the bracket-support for the trip-bolt over said rod. It has since proven to be sufficient to enlarge and flatten the end of the rod, as shown at $h^5$ in Fig. 15, giving it perpendicular walls on each side of the hook, which will just fill the slot in the covering-plate of the scale-base, so as to prevent lateral play, or else the hook has a triangular notch, $h^6$, and the bar over which it takes is made with a knife-edge, which enters said notch, and thereby steadies the rod. Both of these latter expedients may be used advantageously at the same time.

As weighing-machines may be and constantly are applied to the weighing of different materials or to "runs" of different weights of the same material, sometimes the run being five-hundred-pound charges, or even less, and sometimes going up to twenty-five hundred or five thousand pounds, the machine adapted for the latter quantities is usually too bulky or cumbrous when used for the former. To obviate this objection, I construct the weighing-receptacle, as before stated, of sheet metal in cylindrical form and provide it with one or more removable lengthening-rims, $d$, which sit into each other like the sections of a stove-pipe. Therefore, if heavy charges are intended more bulky than the capacity of the receptacle as it stands, an additional rim or section may be added, or if lighter charges then a sufficient number of sections may be taken off to bring the receptacle within the proper limits. The feed-hopper, being mounted on an adjustable rod or standard attached to the scale-standard, will of course be raised or lowered to follow the change in the receptacle as the capacity of the latter is increased or diminished by the addition or removal of these lengthening-rims.

The main discharge-gate at the bottom of the receptacle naturally receives and is expected to support the whole weight of the charge. This requires it to be made of very heavy metal, and, notwithstanding all precautions, frequently causes it to spring. In the construction used by me it also brings so much leverage to bear upon the connection between the catch-arm of said gate and the trip-latch that the latter is not readily disengaged, and a very strong spring must be used on the trip-bolt in order to effect such disengagement. Therefore I provide within the weighing-receptacle, sometimes hereinafter called the "grain-receptacle," immediately above said discharge-gate, a pyramidal or arched shield or support, $d'$, for the superincumbent mass, leaving free access to the main spout and to the surface of the main gate between the sides of said shield and the walls of the receptacle. This relieves the main gate of substantially all pressure, except that from the grain or other material which has passed the shield that lies above it.

Should the machine be very large it may be found desirable to provide a passage-way through the center of the shield, in order that the hollow space inclosed between and beneath its sides may not be wasted. When the gate is open in the discharge operation the charge will flow freely past the shield, being deflected by its sloping surface until the entire contents of the receptacle have escaped, so that it will offer no hinderance to accurate action.

In order to readily remove or replace the feed-hopper I in dismounting or assembling the machine it is provided with a vertical sleeve, $i$, closed at its top, which fits snugly over the upper end of the supporting-rod $b$, adjustably secured to the scale-standard. The weight of the hopper will save the necessity of additional fastening.

In my former application a presser-plate covered the top of the delivery-spout $i'$, and was controlled by the float depending within the weighing-receptacle to slow down the feed of the grain or material being weighed as the equilibrium point was neared. Instead of this in the present improvement a substantially vertical gate, $i^2$, shutting transversely through the spout, is attached to an arm, $i^3$, controlled by the slow-down float in practically the same manner as before. Such a gate is not original with me, except when combined with the particular means for controlling it. A screw-rod, $i^4$, curved on an arc concentric with the axis of this slow-down gate, passes through a central lug from its supporting-frame, or the cross-bar connecting its two supporting-arms, and upon this screw-rod is placed a thumb-nut, $i^5$, which by its adjustment determines the distance to which the gate can be opened away from the floor of the spout, thereby governing the size of the stream flowing through the spout. This is advantageous, since it enables the attendant not only to vary the size of the stream, but also to control its direction. With the stream ungoverned a tendency is frequently noticeable to shoot to one side of the center of the receptacle—a sort of intermittent movement in the flow—which prevents the grain or other material from piling evenly in the center and forming a regular talus on all sides, thereby retarding its action upon the slow-down float, and permitting an undue quantity to heap up before the tripping device is operated. A thumb-screw, $i^6$, is also set in the lug, through which the just-mentioned screw-rod passes, for the purpose of limiting the descent of the gate, that it may not entirely cut off the flow of the stream, or may, when carried to its extreme downward limit, still permit a regular, although much diminished, quantity to pass beneath.

The slow-down float K is adjustably attached to the rock-shaft or axis of the slow-down gate by means of a segment, $k$, and set-screw $k'$, as in said former application; but its supporting-bar is bent backward toward the adjacent wall or side of the grain-receptacle, so as to bring the float at a considerable angle, with the general trend in the same direction as the talus of the charge, in order to prevent any possibility of the charge backing up behind its edge, and retarding it in its yielding motion before the accumulating mass.

The cut-off gate L is operated, as heretofore, by means of a link-connection with the arm from the pivot of the main gate. Instead of being pivoted upon the feed-hopper, however, its pivot is now mounted upon the arm of a bracket, $d^2$, bolted to the weighing-receptacle or to the top section thereof, thus enabling the feed-hopper to be removed without reference to the cut-off gate, and also preserving the relation of the pivot of said gate to its operating device, notwithstanding the sinking of the weighing-receptacle at the moment the scale is actuated.

A register, M, is attached to the outside of the weighing-receptacle, and its operating-arm $m$ is connected by a link, $m'$, with a cranked lateral arm, $m^2$, from the pivot of the main gate, so that every time the gate is depressed to allow a charge to pass the link will be drawn down by the crank and the register will be actuated.

The connection between the link and the crank is preferably made by a coiled spring, $m^3$, so as to insure the operation of the register, whether the gate is opened to its full extent or only partially, said spring yielding to compensate for any range of movement beyond that at which the register is actuated.

In Fig. 18 I have shown a modification intended to provide for the use of the foregoing improvements in connection with a steelyard-scale. In this the grain-receptacle D is provided with the shield $d'$ over the main gate E, the secondary valve or gate, the trip-latch, and the bracket G, supporting the trip-bolt, all carried by it. The trip-stop and its adjustable plate are fast to the walls of a casing, D', inclosing the receptacle D. Links $d^3$, between said walls and the sides of the receptacle, serve to steady the latter, which is suspended from an overhead bar, N, pivoted to a hanger, $n$, from the top of the casing. At the other end this bar is connected by means of a link, $n'$, with the weight-arm of a scale-beam or steelyard, N', fulcrumed at $n^2$ upon the top or plank which supports the before-mentioned hanger. This beam is graduated and provided, as usual, with the necessary accessories for accurate weighing.

A feed-hopper with slow-down gate and cut-off substantially as hereinbefore described will be provided to deliver material to the receptacle, the hopper being supported upon the casing D' and supporting itself, the slow-down gate, and the slow-down float, and the cut-off gate being either supported upon the hopper or upon the weighing-receptacle, preferably the latter. With this construction it is evident that the sinking of the weighing-receptacle when it has received the proper charge will carry the trip-bolt down past the trip-stop and cause the main gate to be released for the discharge of the grain, and the rise of the receptacle, when its contents have been partially discharged, will again reset the mechanism ready for operation as soon as the main gate has returned to its place.

I claim as my invention—

1. The combination, in an automatic weighing-machine, of the weighing-receptacle adjustable as to its size, and a feed-hopper and cut-off mechanism adjustable in position to follow the change in the size of the receptacle.

2. The combination, with the cylindrical weighing-receptacle of sheet metal, of removable lengthening-rims adapted to fit upon the top of the receptacle, and one upon another to change the size of said receptacle, and a feed-hopper adjustable vertically to adapt its position to the varying height of said receptacle.

3. In an automatic weighing-machine, the combination, with the weighing-receptacle and with the discharge-gate, of a shield placed within said receptacle and immediately above said discharge-gate to support the major portion of the superincumbent mass of the charge.

4. The combination, with the feed-hopper and its spout, of a slow-down gate and a slow-down float connected with said gate to operate it, and depending within the grain-receptacle with its face set slantingly in the general trend of the talus of the charge.

5. The combination, with the hopper and with the slow-down gate supported thereon, of an adjustable stop to determine the distance to which said gate may open away from the floor of the delivery-spout.

6. The combination, with the slow-down gate in the delivery-spout, of adjustable stops to determine the distance to which said gate may open away from the floor of the spout, and the distance to which it may close in theretoward.

7. The combination, with the delivery-spout, of the cut-off gate pivoted in brackets from the weighing-receptacle.

8. A slow-down gate consisting of a plate moving edgewise and transversely of the delivery-spout, combined with a float suspended within the weighing-receptacle, and acted upon by the accumulating charge to close said gate gradually.

9. In combination with the trip-latch and the spring attached thereto and carried thereby, a stop against which said spring is brought in the return movement of the latch after the scale has been actuated, whereby said latch is caused to snap over the catch-arm or tang from the main gate as the latter closes.

10. In combination with the trip-latch and the spring carried thereby, a stop upon a fixed part of the frame-work, against which said spring is brought in the return movement of the latch after the discharge-gate has been opened, and means for adjusting said stop to increase or decrease the resilient action of said spring toward the catch-arm from the main gate, to cause the latch to snap over said arm as the main gate closes with certainty.

11. The bracket for supporting the trip-bolt fixed to the casing of the secondary discharge-spout or of the weighing-receptacle, as and for the purpose set forth.

12. The combination, with the trip-stop and trip-latch, of the trip-bolt and its spring, and the adjustable plate or gage to determine the stress of said spring.

13. The bracket for the trip-bolt slotted longitudinally, in combination with said bolt and with stops or gages, and the thumb-screws passing through said slot.

14. The stops or gages for the trip-bolt struck up from sheet metal substantially as described, with a body to rest against the under surface of the bracket, two arms to saddle the bolt, and a third arm bent up from between the other two to enter the slot in the bracket and steady said stop.

15. The combination of the trip-bolt, its bracket, the gage for adjusting the stress of the spring on said bolt, the adjustable stop for the spring on the trip-latch, and the single screw holding said gage and stop and serving as their means of adjustment.

16. In combination with the trip-bolt, an adjustable face-plate upon its stop.

17. In combination with the trip-bolt, a hardened face-plate upon the trip-stop, and means whereby it may be set in varying vertical adjustments, substantially as described.

18. In combination with the trip-bolt, a hardened face-plate upon the trip-stop, and means whereby it may be set in varying angular adjustments, as and for the purpose set forth.

19. In combination with the trip-bolt, a hardened face-plate upon the trip-stop, and means whereby it may be set in varying adjustments, both vertically and angularly, substantially as described.

20. The combination of the trip-stop split or slotted from one end, the hardened face-plate mounted in a seat formed in the opposing arms at said end, and screws passing through both of said arms, whereby they may be caused to clamp the face-plate in any desired adjustment.

21. The combination, with the scale-rod and the trip-bolt, of the trip-stop, transversely slotted at its butt-end to take over said scale-rod, and provided with a set-screw to clamp it thereto in proper relation to the trip-bolt.

22. The combination, in an automatic weighing-machine, of a platform-scale, a weighing-receptacle seated upon the platform thereof, tripping-instrumentalities for the discharge-gate of said receptacle, blocked by a stop upon the scale-rod and released by the descent of the latter when the scale-beam rises, and means for bracing and steadying the scale-rod against the transverse thrust of the tripping agent in contact with its stop.

23. A scale-rod enlarged at the hooked end to fill the slot in the covering-plate of the base, whereby said rod will be steadied against lateral play.

24. The scale-rod having a notch in the curve of its hook, combined with the bar, over which said hook takes, adapted to fit into said notch and steady the rod against the transverse thrust of the trip-bolt.

25. The combination of the register, the link depending from the actuating-arm, the cranked lateral arm from the main gate, and the spring-connection between said link and lateral arm.

26. The combination of the slow-down gate, the curved screw-rod from the covering-plate of the delivery-spout, passing through a lug on the supporting-frame of said gate, the thumb-nut on said rod, and the set-screw threaded into said lug and adjustable toward and from said covering-plate.

27. The combination of the feed-hopper mounted upon a rod or support from the scale-standard, and the cut-off gate moving in the delivery-spout of said hopper, and pivoted in brackets from the weighing-receptacle, substantially as described.

JOHN STEVENS.

Witnesses:
 ALEX. McNAUGHTON,
 JOHN SHIELLS.